F. E. WATTS.
GREASE CUP.
APPLICATION FILED NOV. 30, 1914.

1,140,549.

Patented May 25, 1915.

Inventor
Frank E. Watts

Witnesses
E. R. Barrett
W. K. Ford

By Whittemore Hulbert Whittemore

Attorneys

UNITED STATES PATENT OFFICE.

FRANK E. WATTS, OF DETROIT, MICHIGAN, ASSIGNOR TO HUPP MOTOR CAR COMPANY, OF DETROIT, MICHIGAN, A CORPORATION OF MICHIGAN.

GREASE-CUP.

1,140,549.

Specification of Letters Patent. Patented May 25, 1915.

Application filed November 30, 1914. Serial No. 874,633.

*To all whom it may concern:*

Be it known that I, FRANK E. WATTS, a citizen of the United States of America, residing at Detroit, in the county of Wayne and State of Michigan, have invented certain new and useful Improvements in Grease-Cups, of which the following is a specification, reference being had therein to the accompanying drawings.

The invention relates to grease cups, and consists in the novel construction, arrangement and combination of parts as will more fully hereinafter appear.

While the invention is adapted for other structures, as it is peculiarly useful in connection with steering knuckles for automobiles or vehicles, the invention will be described in connection with a steering knuckle, though it is not desired to limit the protection to this particular use.

Figure 1:
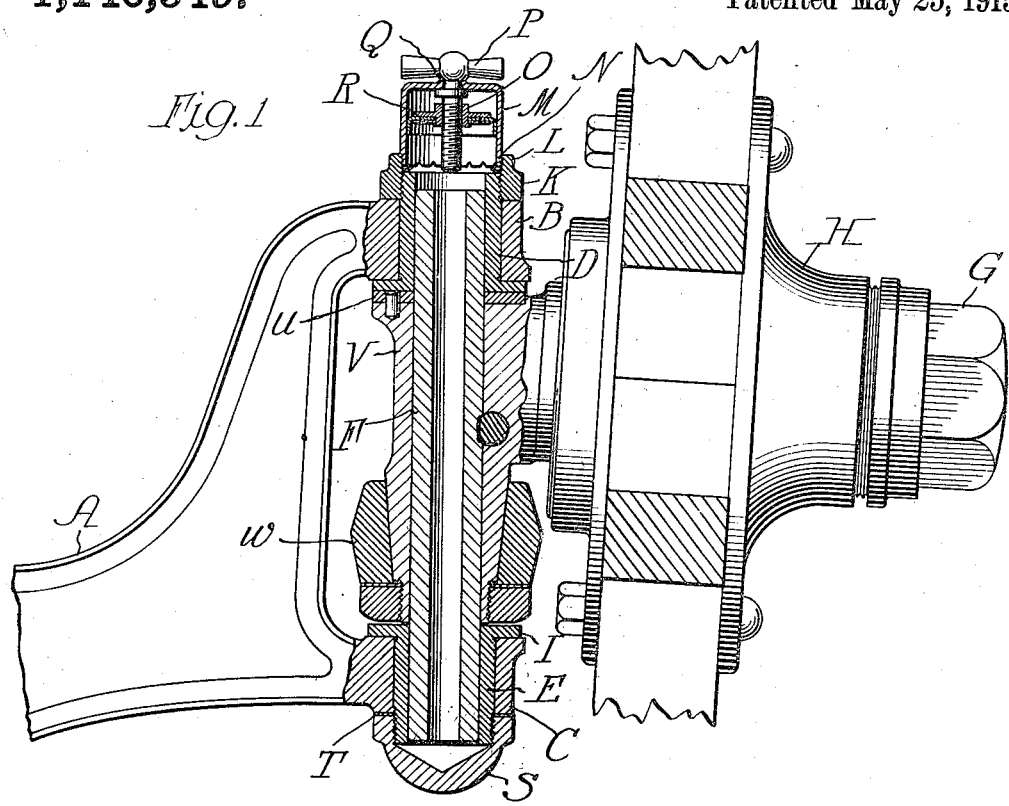
Figure 2:
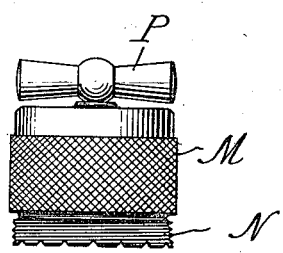
Figure 3:
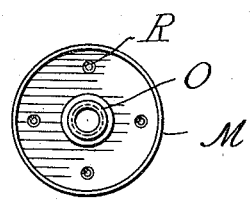

In the drawings,—Figure 1 is a vertical section through a steering knuckle embodying the invention; Fig. 2 is a side elevation of the grease cup; and Fig. 3 is a plan view of the follower.

A designates the front axle of an automobile, having a forked end provided with alined bearings B and C.

D and E are bushings for the bearings B and C respectively, and F is a pivot pin journaled in the bushings. Rigidly connected to the pin F in the usual manner is a spindle G, upon which is journaled the wheel H.

In the structure illustrated the bushings D and E are provided with collars I at their inner ends, while the outer ends of the bushings are threaded to receive nuts to clamp the bushings in place in the bearings. The nut K for securing the bushing D in place is open ended and has a portion L that projects beyond the end of the bushing.

M is the grease cup which has the open end N thereof externally threaded to engage the internal threads on the portion L of the nut K. The nut K therefore performs the function of securing not only the bushing D in place, but also the grease cup M. Arranged within the grease cup is a threaded end O of a thumb-screw P which is swiveled as indicated at Q in the upper end of the grease cup M. Upon the threaded end O is a follower R.

S is a cap nut for securing the bushing E in place, and interposed between the nut and the bearing C is a suitable washer T for sealing the joint therebetween. U is a wear-plate interposed between the inner end of the bushing D and the eye V of the spindle G, which engages the pin F, and W is the bearing of the steering knuckle lever which is fixedly secured to the member V.

In use the hollow pin F is filled with the usual plastic lubricant and after the cup M is filled with lubricant, the cup is engaged with the nut L. A portion of the lubricant within the grease cup may be discharged from time to time into the hollow pin F by turning the thumb-screw P.

The arrangement described not only forms a very simple manner of securing the grease cup in place, but since it is not necessary to provide a bottom for the cup, the construction of the grease cup is materially simplified over the structures now in general use. Furthermore, in the particular embodiment of the invention illustrated, not only may the full length of the hollow pin F be utilized for holding lubricant, but as the upper end of the bushing D in effect forms a continuation of the grease cup, the full capacity of the cup may be used.

What I claim as my invention is:—

1. The combination with a bearing, a bushing therein, means for securing said bushing in place, and a grease cup attached to said bushing.

2. The combination with a member to be lubricated, of a nut for securing said member in place, and a grease cup attached to said member.

3. The combination with a bearing, of a bushing therein having a threaded end, a threaded nut engaging said threaded end for securing the bushing in place, and a grease cup having a threaded portion for engaging the threads of the nut.

4. The combination with a bearing, of a bushing therein, a hollow pin journaled in the bushing, a nut for securing said bushing in place, and a grease cup attached to said nut and in alinement with said hollow pin.

5. The combination with bearings, of bushings therein, a hollow pin journaled in the bushings, a nut for securing one of said bushings in place, a grease cup attached to one of the bushings, and a cap nut for securing the other bushing in place.

6. The combination with a bearing, a bushing therein, a nut for securing the bushing in place, and a grease cup comprising a cup-shaped member having the lower end threaded to engage the threads of said nut, a thumb-screw swiveled in the top of the cup-shaped member and having a threaded stem arranged therein, and a follower fitting the interior of the cup and having a threaded engagement with said stem.

In testimony whereof I affix my signature in presence of two witnesses.

FRANK E. WATTS.

Witnesses:
 DON T. HASTINGS,
 GRANVILLE C. ALDRICH.